United States Patent [19]
Zeien

[11] Patent Number: 5,471,308
[45] Date of Patent: Nov. 28, 1995

[54] PHASE SHIFTING DEVICE

[76] Inventor: Robert Zeien, 150-T Executive Dr., Edgewood, N.Y. 11717

[21] Appl. No.: 310,491

[22] Filed: Sep. 22, 1994

[51] Int. Cl.$^6$ ............................................. G01B 11/24
[52] U.S. Cl. ............................... 356/376; 250/237 G
[58] Field of Search ....................... 356/376; 250/237 G

[56] References Cited

U.S. PATENT DOCUMENTS 4,984,893  1/1991  Lange ............................ 356/376

*Primary Examiner*—F. L. Evans
*Attorney, Agent, or Firm*—Kenyon & Kenyon

[57] ABSTRACT

The invention provides a device for shifting the phase of a projected grating by use of a plurality of transparent plates, each disposed at a different angle with respect to the angle of the grate, which plates may be selectively placed between the grating and the projecting lens of a projecting system to modulate, that is, to shift, the phase of the projection of the grating on a test surface.

6 Claims, 2 Drawing Sheets

PHASE SHIFTING DEVICE

BACKGROUND OF THE INVENTION

This invention relates to phase shifting mechanisms and particularly to a phase shifting mechanism for projected fringe contouring devices.

Surface profile measuring by means of non-contact optical methods are widely used in a variety of fields including medicine and human modeling applications.

U.S. Pat. No. 4,984,893 issued to Steven R. Lange on Jan. 15, 1991 and entitled "Phase Shifting Device and Method" discloses a phase shifting device for producing transverse shifts of a projected grating. In that patent, the phase shift is accomplished by use of a flat transparent glass plate which is rotatable about an axis generally parallel to the lines of the grating. The transparent glass plate is rotated through a plurality of selected angles to provide modulation of the phase of the grating projected on the test surface.

While the device disclosed in that patent accomplishes its intended purpose, it is relatively costly as it requires the use of an expensive step motor and related controller to rotate the lens. In addition, the time necessary for the motor to rotate between the desired angles is substantial and increases the time necessary to complete each cycle of the imaging process.

SUMMARY OF THE INVENTION

It is an object of the present invention to provide an inexpensive, simple device for producing phase shifts of a projected grating.

It is a further object of this invention to provide precise predetermined phase shifts of a projected grating without the necessity of critical calibration requirements.

It is a further object of this invention to provide a device for precise predetermined phase shifts of a projected grating which does not require recalibration or readjustment during normal field operations.

It is a further object of this invention to provide a device for precise predetermined phase shifts of a projected grating in which the angles of the phase shifts are predetermined and cannot be inadvertently changed.

The invention provides a device for shifting the phase of a projected grating by use of a plurality of transparent plates, each disposed at a different angle with respect to the angle of the grate, which plates may be selectively placed between the grating and the projecting lens of a projecting system to modulate, that is, to shift, the phase of the projection of the grating on a test surface.

DETAILED DESCRIPTION OF THE DRAWINGS

Figure 1:
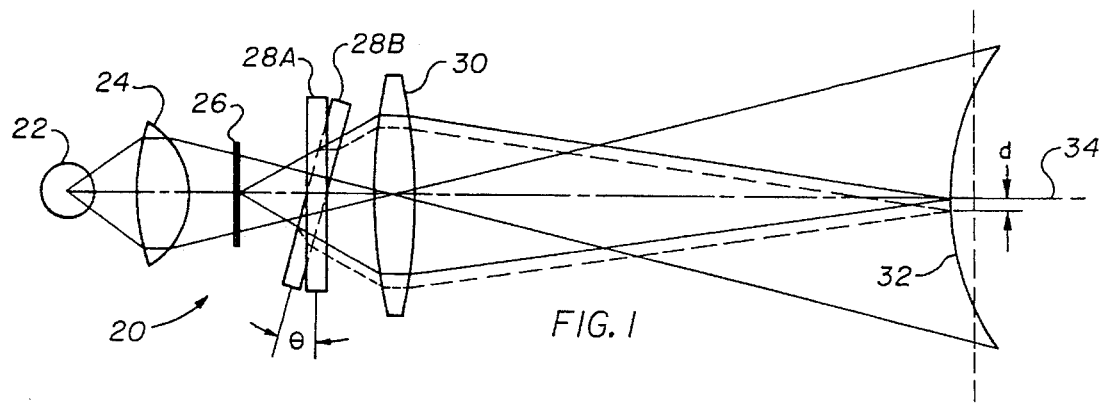
FIG. 1 is a schematic diagram of a phase shifting projector embodying the present invention.
Figure 2:
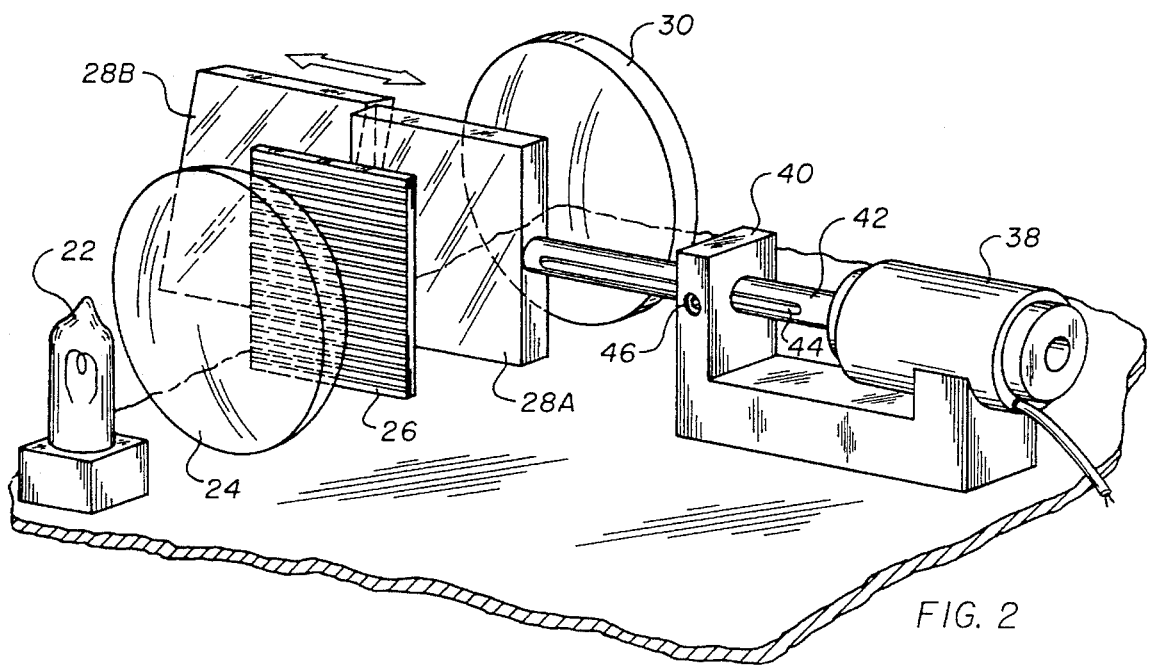
FIG. 2 is a perspective diagrammatic view of the phase shifting projector of FIG. 1 with, parts broken away.

Referring now to the drawings and particularly FIG. 1 and FIG. 2, a phase shifting projector 20 is shown including a suitable light source 22, which may be an incandescent lamp, a condensing lens 24, grating 26, flat plastic or glass plates 28A and 28B at different angles, only one of which would be in the light path at any time, and a projecting lens 30. The grating 26 may be a sinusoidal grating having a pattern of sinusoidally varying intensity grid lines. A spherical test surface 32 is positioned on the axis 34, along which all elements are optically aligned. While the test surface 32 shown is spherical, it will be understood that it can, and usually will, be an irregular shape. Although not shown herein, a heat absorbing filter may be positioned between the light source and the rest of the system to prevent heat damage to the components.

Referring now to FIG. 2, the two transparent plastic or glass plates 28A and 28B are shown mounted adjacent to each other at the end of a shaft 42 attached to a linear motor 38. As shown in FIG. 2, the linear motor 38 may be in the form of a solenoid. The shaft 42, motor 38 and flat transparent plastic or glass plates 28A and 28B are mounted along an axis perpendicular to the optical axis 34 of the elements shown in FIG. 1 and FIG. 2. The motor 38 and shaft 42 are mounted on a frame 40, and a set screw 46 engages a slot 44 in the shaft 42 to prevent rotation of the transparent plastic or glass plates 28A and 28B. The motor 38, which is readily available in the commercial market, is designed to move the shaft 42 between a first position in which the transparent plate 28A is in the path of the light rays emitting from the source 22 and a second position in which the transparent plate 28B is in the path of the light rays emitting from the source 22. Thus, the two transparent plastic or glass plates 28A and 28B are designed to be alternately positioned in the light path along the optical axis 34.

In operation, light from the light source 22 first passes through the condensing lens 24 and then through the grating 26, which is disposed normal to the optical axis 34. The light then passes through either plate 28A or plate 28B, depending on which one is disposed in the light path, after which the light passes through the projecting lens 30 and onto the test surface 32.

In FIG. 2, the transparent plastic or glass plate 8A is disposed normal to the optical axis 34. In other words, the plate 28A is disposed at an angle of 0 degrees with respect to the plane of the grating 26 (because the grating 26 is also disposed normal to the optical axis 34). The transparent plate 28B is fixed at an angle $\theta$ with respect to the transparent plate 28A (and therefore at an angle $\theta$ with respect to the grating 26). As shown hereinbelow, the angle $\theta$ will be predetermined for any particular mechanism constructed in accordance with this invention.

As stated above, image rays from the sinusoidal grating 26 pass through the projection lens 30 to project an image of the slide on the test surface 32. The image on the test surface 32, when viewed at an angle from the optical axis of the system, will be a deformed projection of the sinusoidal grating and will form the basis for measuring the test surface.

Figure 3:
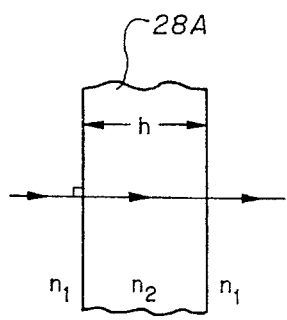
FIG. 3 and FIG. 4 illustrate how a light ray displacement "d" results from an angular difference between plate 28A and 28B of the embodiment of the invention shown in FIG. 1.
Figure 4:
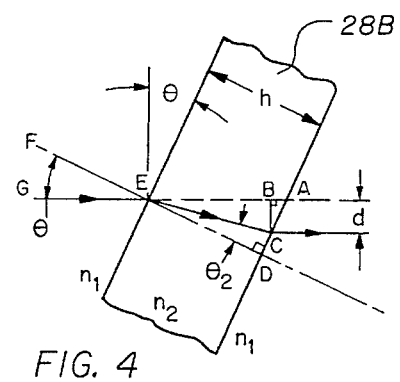

The phase of the projected sinusoidal image is shifted by moving plate 28A out of the path of the image rays from the sinusoidal grating 26 and moving plate 28B into the path of the image rays from the sinusoidal grating 26. The mechanics of this phase shift can best be understood with reference to FIGS. 3 and 4. In FIG. 3, a light ray at normal incidence passes through the flat plate 8A of thickness "h" without deviation. In FIG. 4, a light ray passes through the flat plate 28B, which is disposed at an angle θ with respect to the path of the light ray (or, in other words, the light ray strikes the plate 28B at an angle θ with respect to the line EF normal to the plate 28B). As the light ray enters the flat plate 28B, the light ray will be bent toward the surface normal EF, and as it leaves the flat transparent plate 28B it will be bent away from the surface normal EF to the same degree that it was bent upon entering the flat transparent plate 28B. As a result of refraction as the ray enters and leaves the flat transparent plate 28B, the ray will remain parallel to its initial direction but will have been displaced by the distance "d" which is a function of the thickness "h" of the flat transparent plate 28B, the angle θ and the index of refraction of the plate. The displacement "d" is given by the following equation:

$$d = h \sin\theta [1 - \cos\theta / \sqrt{(n_2/n_1)^2 - \sin^2\theta}\ ]$$

By choosing the appropriate angle θ, the projected grating can be shifted by the desired amount "d".

Figure 5:
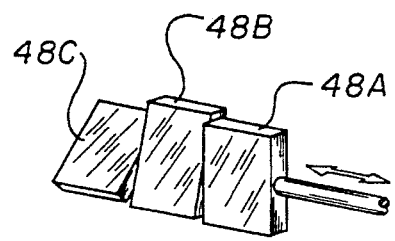
FIG. 5 is a perspective diagrammatic view of another embodiment of the invention showing means for producing three finite phase shifts.

FIG. 5 shows a variation of the invention in which three transparent plates 48A, 48B and 48C are mounted on a common axis of the motor 38 at three different positions. The motor 38 is designed to move between three positions, corresponding to the three plates. In the first position, transparent plate. 48A, which is normal to the optical axis of the system, is in the path of the light emitting from light source 22. In the second position, the transparent plate 48B is in the path of light emitting from light source 22. In the third position, the transparent plate 48C is in the path of light emitting from light source 22. Transparent plate 48B is fixed at an angle θB with respect to a plane normal to the optical axis of the system, while transparent plate 48C is fixed at an angle θC.

Figure 6:
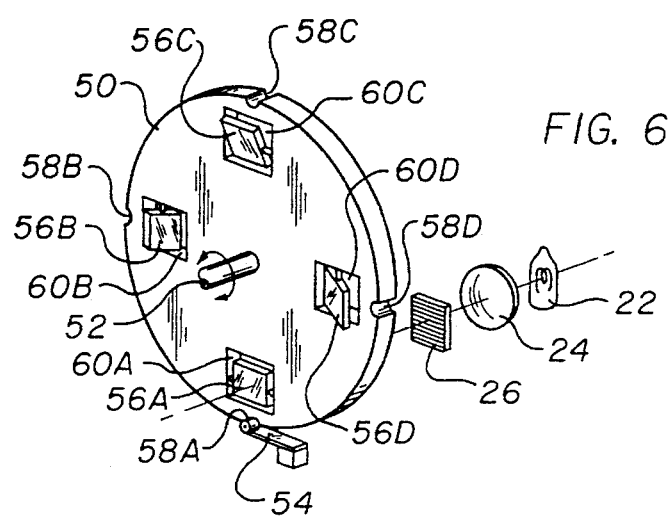
FIG. 6 is a perspective diagrammatic view of another embodiment of the phase shifting mechanism of the present invention schematically showing an embodiment of the present invention in which a plurality of transparent plates mounted at different angles on a disk may be selectively rotated into the path of a projected grating to shift the phase of the projected grating.

In the embodiment of the invention shown in FIG. 6, four transparent plates 56A, 56B, 56C and 56D are mounted at different angles and are fixed in windows 60A, 60B, 60C and 60D in a disk 50 which is rotatably mounted about an axis parallel to the axis of the light emitting from source 22. Transparent plate 56A is in a plane perpendicular to the optical axis of the system, while the other plates are fixed at angles of θ3, θ4 and θ5 with respect to the optical axis of the system. The disk 50 is rotated by a motor, not shown, between the four positions. In each position, one of the flat transparent plates 56A, 56B, 56C or 56D will be held by the spring loaded detent 54 which engages notches 58A, 58B, 58C and 58D to position the respective flat transparent plate in the path of the light source. The angles θ3, θ4 and θ5 between the transparent plate 56A and the transparent plates 56B, 56C and 56D, respectively, will result in a shift d3, d4 or d5 depending on which flat transparent plate is positioned along the axis of the light source.

Figure 7:
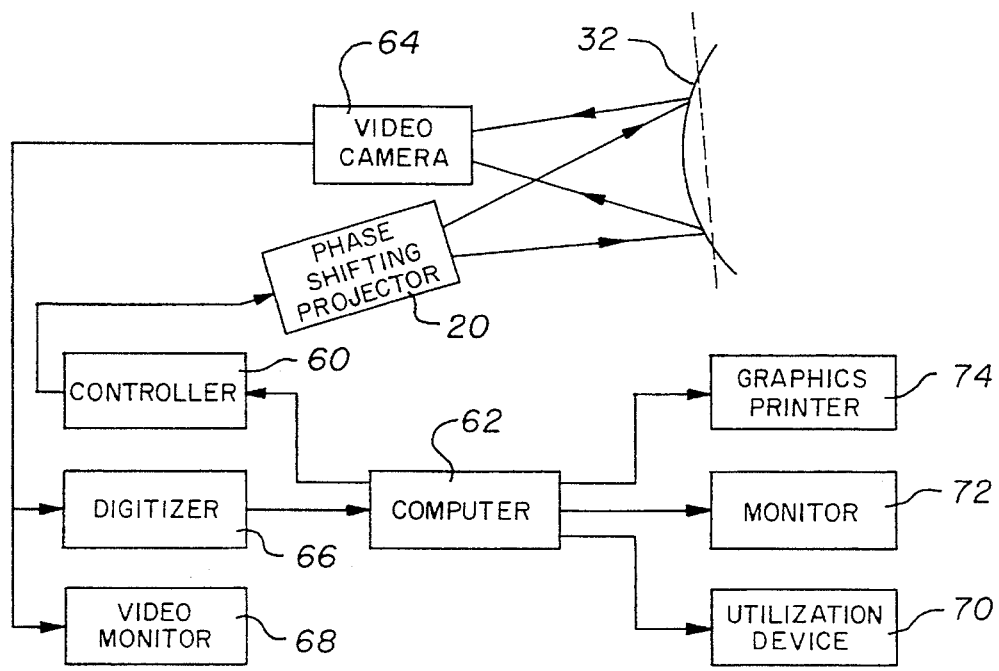
FIG. 7 is a block diagram of a projected fringe contouring system utilizing the phase shifting projector of FIG. 1.

Referring now to FIG. 7, there is shown in schematic form an optical measuring system incorporating the phase shifting device 20 shown in FIG. 1. The system shown in FIG. 7 is representative of the types of systems which may utilize the invention shown herein and is shown for illustrative purposes. The other individual components and the general arrangement are well known to those skilled in the art.

The phase shifting projector 20 receives signals from a controller 60 connected to a computer 62 and projects a grating pattern on a test surface 32. A video camera 64 views the image produced on the test surface 32 and generates an analog signal which is encoded by the digitizer 66 and transmitted to the computer 62. A video monitor 68 allows direct viewing of the video camera output. The output signal from the computer 62 is supplied to a utilization device 70 which utilizes the output signal. The output signal may also be supplied to other devices such as a monitor 72 and a graphics printer 74.

I claim:

1. A phase shifting projector comprising:

a. a light source;

b. a condensing lens receiving light from the light source;

c. a transparent slide having a grating thereon;

d. a projecting lens;

e. a first flat transparent plate disposed in a plane at a first angle with respect to a plane in which said grating is disposed;

f. a second flat transparent plate disposed in a plane at a second angle with respect to a plane in which said grating is disposed; and g. a positioning mechanism for alternately positioning each of said flat plates between the grating and the projecting lens, in a path of projected light which passes from the light source through the condensing lens, grating and projecting lens, in order to shift the phase of an image of the grating projected on a test surface.

2. The phase shifting projector of claim 1 wherein the positioning mechanism comprises a shaft to which the first and second flat transparent plates are fixed and a mechanism for moving the shaft between a first position in which the first transparent plate is in the path of projected light and a second position in which the second transparent plate is in the path of projected light.

3. The phase shifting projector of claim 1 wherein the first angle is zero degrees, such that the first flat transparent plate is disposed in a plane parallel to a plane in which said grating is disposed.

4. A phase shifting projector comprising:

a. a light source;

b. a condensing lens receiving light from the light source;

c. a transparent slide having a grating thereon;

d. a projecting lens;

e. a plurality of transparent flat plates, each plate being fixed at a predetermined angle with respect to a plane in which said grating is disposed; and f. a positioning mechanism for alternately positioning each of the plates between the grating and the projecting lens, in a path of projected light which passes from the light source through the condensing lens, grating and projecting lens, in order to shift the phase of an image of the grating projected on a test surface.

5. The phase shifting projector of claim 4 wherein the positioning mechanism comprises a shaft to which the transparent plates are fixed and a mechanism for moving the shaft to a plurality of positions, in each of which positions one of said transparent plates is in the path of projected light.

6. The phase shifting projector of claim 4 wherein the positioning mechanism comprises a disk rotatable about an axis parallel to an optical axis of the projector and a mechanism for rotating the disk whereby each of the transparent plates may be alternately rotated into a position in the path of projected light.

* * * * *

UNITED STATES PATENT AND TRADEMARK OFFICE
CERTIFICATE OF CORRECTION

PATENT NO. : 5,471,308
DATED : Nov. 28, 1995
INVENTOR(S) : Robert ZEIEN

It is certified that error appears in the above-indentified patent and that said Letters Patent is hereby corrected as shown below:

| Column | Line | |
|---|---|---|
| 1 | 60 | After "difference" insert --θ--. |
| 2 | 53 | Change "8A" to --28A--. |
| 3 | 8 | Change "8A" to --28A--. |

Signed and Sealed this

Ninth Day of April, 1996

Attest:

BRUCE LEHMAN

Attesting Officer     Commissioner of Patents and Trademarks